United States Patent [19]

Stauffer

[11] Patent Number: 4,853,532

[45] Date of Patent: Aug. 1, 1989

[54] SPECULAR SURFACE INHIBIT

[75] Inventor: Norman L. Stauffer, Englewood, Colo.

[73] Assignee: Honeywell Inc., Minneapolis, Minn.

[21] Appl. No.: 199,636

[22] Filed: May 27, 1988

[51] Int. Cl.[4] ............................................. G01V 9/04
[52] U.S. Cl. ........................................ 250/221; 356/4
[58] Field of Search .................... 250/221, 222.1, 561; 356/1, 4

[56] References Cited

U.S. PATENT DOCUMENTS

| | | | |
|---|---|---|---|
| 3,851,168 | 11/1974 | Erbstein | 250/221 |
| 3,900,261 | 8/1975 | Wingate | 356/4 |
| 3,923,395 | 12/1975 | Bodlaj | 356/4 |
| 3,937,574 | 2/1976 | Peckham et al. | 356/4 |
| 4,091,275 | 5/1978 | Wilwerding | 356/4 |
| 4,180,726 | 12/1979 | De Crescent | 250/222.1 |
| 4,258,255 | 3/1981 | Guscott | 250/221 |
| 4,434,363 | 2/1984 | Yorifuji et al. | 250/221 |
| 4,590,410 | 5/1986 | Jönsson | 250/221 |
| 4,716,430 | 12/1987 | Stauffer | 356/4 |
| 4,733,081 | 3/1988 | Mizukami | 250/221 |
| 4,788,439 | 11/1988 | Hardy et al. | 250/561 |

Primary Examiner—David C. Nelms
Assistant Examiner—Stephone B. Allen
Attorney, Agent, or Firm—Charles J. Ungemach

[57] ABSTRACT

A proximity detection system which detects the presence of highly specular surfaces which could produce erroneous indications for the system and suppresses them so that they will not affect the system adversely.

19 Claims, 2 Drawing Sheets

SPECULAR SURFACE INHIBIT

BACKGROUND OF THE INVENTION

1. Field of the Invention.

The present invention relates to apparatus for detecting when energy is being reflected from a specular surface and for inhibiting signals from the detectors when the reflection is specular.

2. Description of the Prior Art.

In my U.S. Pat. No. 4,716,430, I describe a pulse proximity detection system wherein a light emitting diode sends a pulsed beam of energy to a remote surface for reflection therefrom. A pair of detectors which are spaced from the remote surface by different distances receive the reflections and produce electrical signals in accordance with the amount of energy they receive. The difference in magnitude of these signals is a function of the distance to the remote surface, and in my patent I determine this difference by taking the signal from the two detectors and releasing them through a pair of RC circuits whose resistance and capacitance values are set so that the signals are allowed to decay at different rates. Since the detector which is closest to the surface will have a larger signal built up thereon, the RC circuit with which it is associated is allowed to decay faster than the other detector. Accordingly, at some time after the signals are released to the RC circuits, for example by sample-and-hold circuits used in my patent, the signals will have decayed to the same value. A comparator determines when this time has occurred and produces an output accordingly. The length of time is dependent upon the difference in the magnitudes of the signals and accordingly is indicative of the distance to the remote surface. A somewhat similar system is disclosed in U.S. Pat. No. 3,937,574 wherein instead of using a time decay, the output of one detector is divided by the difference between the outputs of the two detectors to obtain a signal indicative of the distance to the remote surface.

As explained in my U.S. Pat. No. 4,716,430, the surface should be at least partly diffuse so that reflected energy from the spot upon which the LED directs the energy comes off at various angles which would not be the case if the surface were very highly specular. As a matter of fact, if a highly specular surface were encountered, the reflections back from the surface would be such that the output of the detectors would likely be erroneous and the calculation of the distance to the remote surface in error.

It is therefore desirable to determine when a specular surface is encountered and, when so encountered to inhibit any signals from the detectors from that surface so that an erroneous signal indicative of range is not produced. Erroneous range signals may be a significant problem with respect to some apparatus utilizing the circuitry of my patent. For example, in robotics, the circuitry may be used to determine the distance to objects which a robot moving around the area wishes to avoid. If false signals are encountered and not inhibited, the robot might collide with such objects or otherwise cause harm to its system operation.

SUMMARY OF THE INVENTION

The present invention determines whether or not the reflection from a remote surface is highly specular by virtue of my observation that when the system encounters a highly specular surface, the amount of reflected energy received by one or both of the detectors will be much greater than when the surface is diffuse. Since highly specular reflections are also highly directional, it is common for one but not both of the detectors to receive all or most of the return energy as the remote object is scanned. Accordingly, the present invention may employ a level detector which only passes signals above a certain value, which value is set according to the level expected of a specular surface. This passed signal then is indicative of encountering a specular surface and may be used to inhibit the apparatus from determining the range to that object. Alternately, I have observed that as the system is scanning a variety of objects, as would be the case with a robot, when the scan passes from a diffuse reflection to a highly specular reflection, the rate at which the energy received by the detectors is received increases rather rapidly compared to when it passes from one diffuse object to another. Accordingly a high pass filter circuit may be used to pass only signals that increase at a rapid rate. Both the high pass and level detecting circuits may also be used together to produce the desired signal for inhibiting the operation of the system.

As a third alternative, a microprocessor may be programmed to determine when the signals being received by the detectors are increasing rapidly or have reached a greater value than the threshold value desired and to produce inhibit signals when this occurs. This alternative has the advantage that one may be able to use the microprocessor which is employed by the robot in controlling its motion and in performing its tasks and thus avoid having to supply filter and level detector circuits.

DETAILED DESCRIPTION OF THE PREFERRED EMBODIMENTS

Figure 1:
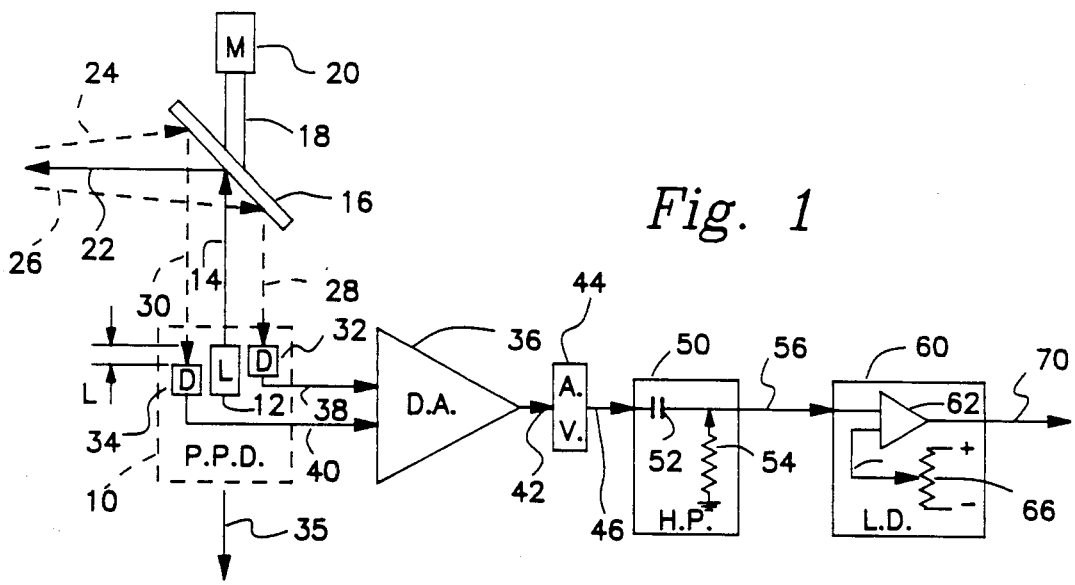
FIG. 1 shows a schematic diagram of a first embodiment of the present invention utilizing a high pass circuit and a level detecting circuit.

In FIG. 1, a pulse proximity detector 10 like that described in my above-mentioned U.S. Pat. No. 4,716,430 is shown in simplified form comprising a light emitter such as an LED 12 for directing light along a path shown by arrow 14 to a reflector such as a rotating mirror 16 connected by a shaft 18 to a motor 20. Mirror 16, shaft 18, and motor 20 may be part of a robot which is mobile within an area to perform tasks and is desirous of viewing its area of work as, for example, by rotating the mirror 16 through a 360° scan so that light travelling along path 14 is reflected along a path 22 to be reflected off all of the various objects in its surroundings. Mirror 16 is caused to rotate relatively slowly, as for example, 1 to 2 revolutions per second while the light emitting diode 12 is modulated so as to produce pulses of light fairly rapidly, as for example, every 0.5 to 2 milliseconds. Accordingly, the light travelling along path 22 will strike substantially all of the objects in the robot's surroundings and be reflected back along paths such as shown by dash lines 24 and 26 to the mirror 16 where it is reflected downwardly along paths shown as dash lines 28 and 30 to first and second detectors 32 and 34 located in the pulse proximity detector at slightly different distances, L, away from the remote object. As is explained in my above-mentioned U.S. Pat. No. 4,716,430, a greater signal will build up on detector 32 than on detector 34 because of this difference in distance and the difference between the signal on the two detectors is a function of the range to the remote object. This range signal is produced at an output shown by arrow 35 for use by the control system of the robot. To inhibit signals which are derived from specular surface reflections, the signals from the detectors 32 and 34 are also presented to a differential amplifier 36 along lines shown as arrows 38 and 40, respectively. Differential amplifier 36 will detect the difference in the signals on lines 38 and 40 and produce an output on a line shown by arrow 42.

As explained above, the range signal is only accurate so long as the remote object has some diffuse property and is not highly specular so that enough of the reflected energy will travel along paths 24 and 26 to reach detectors 32 and 34 in sufficient amounts to allow the system to operate satisfactorily. If the object is highly specular, and approximately normal to path 22, then the amount of radiation received by the detectors becomes unrelated to range. With a highly specular surface, light travelling from LED 12 will be substantially totally reflected back towards mirror 16 in a narrow beam and accordingly either one of the detectors or possibly both will receive a much higher level of radiation than from a diffuse object. Accordingly, the output of amplifier 36 may be highly positive or highly negative depending on which of the detectors receives the most reflected light in the narrow beam. In order to utilize the either highly positive or highly negative output from amplifier 36 to produce an inhibit signal for the system, line 42 is shown connected to an absolute value circuit 44 which will produce an always positive output (or negative output, if desired) on a line 46, whether the signal on line 42 is positive or negative. Likewise, as mirror 16 rotates, the rate of change of the difference signal when a highly specular surface is encountered is very rapid as compared to the change which occurs when the scanning encounters first and second diffuse objects. As explained, it is undesirable to use signals representative of specular surfaces to try to determine range to the objects since such range would likely be in error and not useful or actually harmful to the operation of the robot. While inhibit signals will cause the robot to be uncertain about the specular object, such uncertainty is better than having erroneous range information and not know of the error. To minimize the possibility of serious collisions, the robot may be controlled to slow down or stop if the inhibit signal persists. The present invention operates to detect the too large or too rapidly changing signals which are created because of reflections from highly specular surfaces and to produce inhibit signals accordingly.

To this end, a high pass filter circuit 50 is employed comprising a capacitor 52, one side of which is connected to receive the signals on output 46 and the other side of which is connected to a resistor 54 which has it other end connected to ground The values of capacitor 52 and resistor 54 are selected so as to pass those signals which have a high rate of change which, as explained above, is indicative of a highly specular surface. Accordingly, only signals which are from such highly specular surfaces will produce a significant output from high pass 50 along a line such as shown by arrow 56. Signals of lower rate of change will be suppressed by filter 50 and will be of smaller magnitude than those representing signals from highly specular surfaces.

While the output on line 56 alone might be used to inhibit the range detection signal on line 35 or 42, some lower magnitude signals may also exist on line 56 and to make sure that valid range signals are not also suppressed, a level detect circuit 60 is employed. Level detect circuit 60 is shown having an amplifier 62 therein for receiving the signal on line 56 at a first input thereof. Amplifier 62 has a second input connected to the wiper 64 of a resistive winding 66, the upper end of which is connected to a positive voltage source and the lower end of which is connected to a negative voltage source or ground so that by positioning wiper 64, a predetermined reference level of voltage (either positive or negative, depending on whether the output of absolute value circuit 44 is chosen to be positive or negative) may be presented to the lower terminal of amplifier 62. Amplifier 62 operates to produce an output on a line 70 whenever the input on the upper terminal of amplifier 62 exceeds the level of input on the lower terminal thereof. Accordingly, signals below the predetermined level set by the wiper 64 will not produce an output on line 70 whereas signals which are above the predetermined reference level will do so. The reference level is set so that only those signals truly representative of highly specular surfaces produce outputs on line 70 but to block those which are of lower level due to reflections from diffuse surfaces. Accordingly, the output on line 70 will be indicative only of the encountering of a highly reflective surface and the signal may be used therefore to inhibit the range signal being produced by the proximity detector at output 35 thereof. In this way, the robot will disregard the signals from the highly specular surfaces and will respond only to those reflected from diffuse surfaces as is desired.

Figure 2:
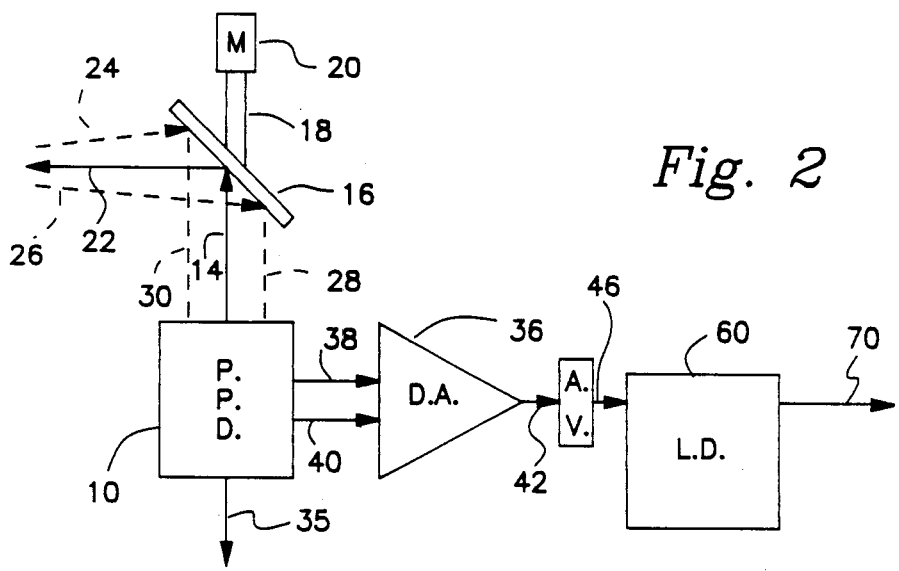
FIG. 2 shows a second embodiment of the present invention utilizing a level detect circuit without a high pass filter.

FIG. 2 shows an alternate embodiment of the invention in which the high pass filter 50 of FIG. 1 is omitted since, as explained above, the output of differential amplifier 36 is in itself much higher (positive or negative) when responding to signals from specular surfaces than it is when responding to signals from diffuse surfaces. Accordingly, the signal on line 46 in FIG. 1 will be considerably greater for specular surfaces than for non-specular surfaces and the level detect circuit 60 can, alone, be set to pass those signals out to line 70. The apparatus of FIG. 2 carries the same reference numerals as were used with respect to FIGURE 1 and, aside from the omission of high pass filter 50, FIG. 2 is substantially identical to FIG. 1 and it operation need not be further explained.

Figure 3:
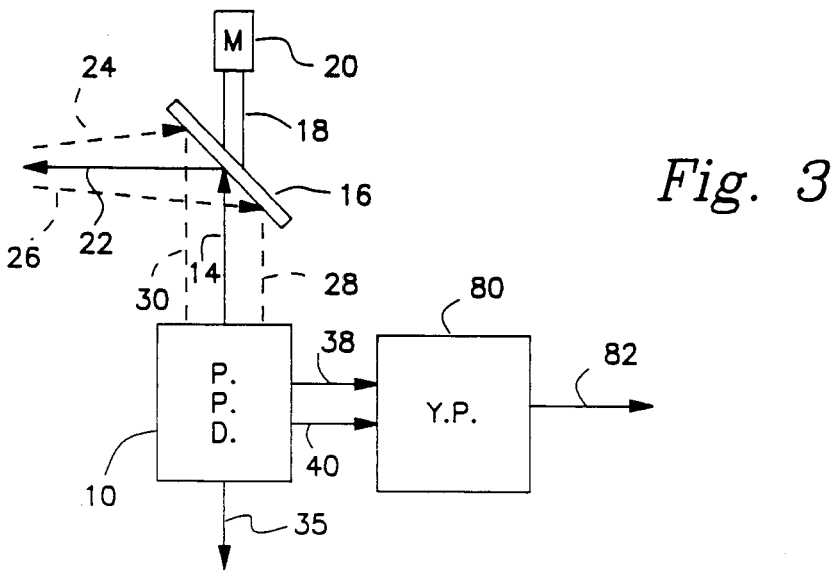
FIG. 3 shows a third embodiment of the present invention utilizing a microprocessor.

FIG. 3 shows another alternate embodiment of the present invention in which a microprocessor 80 which may be part of the robotic control system is employed to receive the signals from the proximity detection device 10. Microprocessor will be programmed in a convenient manner, such as will be described in connection with FIG. 4 below, for example, to compare the signals on lines 38 and 40 from the proximity detection device 10 and to take the difference therebetween and determine if it exceeds a predetermined level as was the case with respect to FIG. 2 or, to determine if the rate of change is greater than a predetermined level as was the case in connection with FIG. 1 and to produce an output along a line shown by arrow 82 indicative of when these levels are exceeded so that the signal on line 82 can be used to inhibit the signal from line 35 to the robot.

Figure 4:
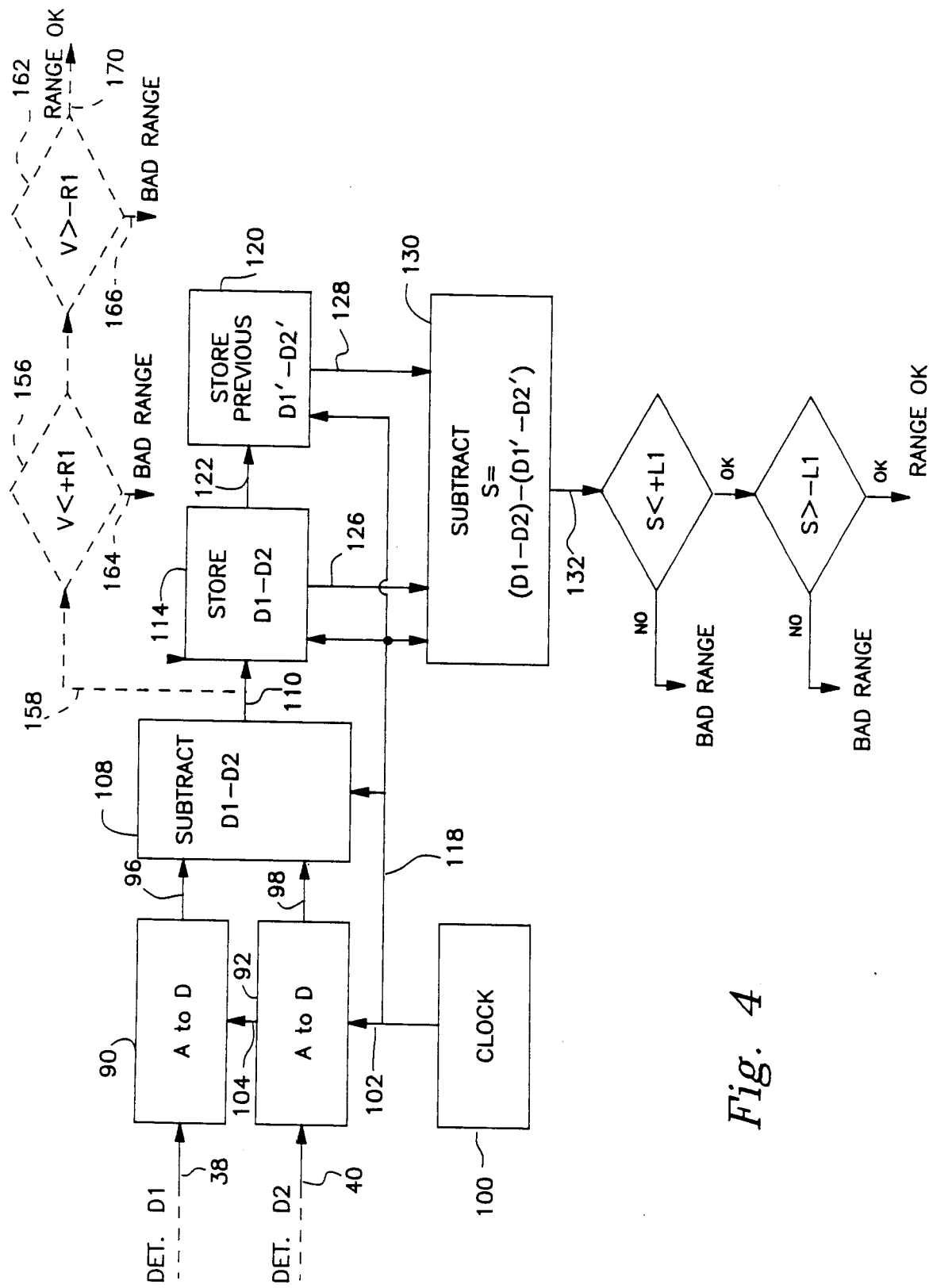
FIG. 4 shows a schematic diagram of a program which may be used by a computer to provide the inhibit signal of the present invention.

In FIG. 4, the signals on lines 38 and 40 are shown being presented to a pair of analog to digital converters 90 and 92, respectively, in order to produce digital signals on outputs shown by arrows 96 and 98, respectively, indicative of the radiation sensed by detectors $D_1$ and $D_2$ which represent the detectors 32 and 34 of FIG. 1, respectively. A to D converters 90 and 92 are clocked by a clock pulse generator 100 over outputs shown by arrows 102 and 104, respectively The digital signals on lines 96 and 98 are presented to a subtract circuit 108 which operates to determine $D_1-D_2$ and produce an output signal indicative thereof on an output shown as arrow 110. A signal storage section 114 receives and stores the value of subtraction $D_1-D_2$ from output 110 and, in accordance with a signal from clock 100 over an output shown by arrow 118, periodically transfers the $D_1-D_2$ signal to a second signal storage section 120 over an output shown by arrow 122. At the same time, clock 100, through outputs 102 and 118, causes subtract circuit 109 to receive a next digital signal from A to D circuits 90 and 92 and to transfer the new $D_1-D_2$ signal to the store section 114 so that the signal in section 114 always represents the current value of $D_1-D_2$ while the signal in section 120 represents the previous $D_1-D_2$ value referred to as $D_1'-D_2'$. Store section 120 is also connected to clock output 118 and both store sections 114 and 120 are caused to present their stored signals representative of $D_1-D_2$ and $D_1'-D_2'$, respectively over outputs shown by arrows 126 and 128, respectively to a second subtract circuit 130. Subtract circuit 130 produces a signal "S" representative of the subtraction $(D_1-D_2)-(D_1'-D_2')$ and this value is produced on an output shown by arrow 132. In effect, the value of S is indicative of the rate of change of the signals from the detectors since a previous value is subtracted from a present value and S will become large when a highly reflective surface is first encountered.

A first level check circuit 136 receives the "S" output from subtract circuit 130 and compares this with an internal reference value "+L1". So long as no highly reflective surface has been encountered, the S signal will be below the positive reference +L1, value, and an "OK" signal will be passed as an output shown by arrow 138. If a highly reflective surface has been encountered, either $D_1$ and/or $D_2$ will be very large and $D_1-D_2$ will be very positive or very negative. If very positive, S will be greater than the reference value +L1 and, accordingly, a "bad range" signal is passed as an output shown by arrow 140 which corresponds to the output 82 of FIG. 3. Of course, $(D_1-D_2)$ could be a very large negative signal if $D_2$ received most of the highly reflected light and accordingly the "OK" signal on line 138 is checked by a second level check circuit 142 where S is compared with an internal reference value "−L1". If S is not highly negative, then it would be greater than "−L2" and a final "Range OK" signal is presented as an output shown by arrow 144. If, however, the value of $D_1-D_2$ is very negative so that S is very negative, S will be less than "−L1" and a "bad range" signal will be passed as an output shown by arrow 146 which also corresponds to the output 82 in FIG. 3. The above logic circuit can be used by the computer to detect highly reflective objects using the rate of change of intensity principle described in connection with the rate circuit 50 of FIG. 1. If desired, the magnitude of $D_1-D_2$ can be also checked by using a pair of level check circuits like 136 and 144 connected to receive a value V representative of the $D_1-D_2$ output of subtract circuit 108 on line 110. The first circuit 156 shown in dashed line 5 is shown receiving the "V" signal on line 110 as is indicated by dashed line output 158. Level check circuit 156 checks to determine if V is less than a positive reference value "+R1". The second level check circuit 162 checks to determine if V is greater than a negative reference value "−R1". If either of these conditions is not met, a "bad range" inhibit signal is passed as by outputs shown as dashed arrows 164 and 166, respectively. Otherwise, the "Range OK" signal is passed by an output shown as dashed arrow 170. Thus, the computer may use the magnitude principle described in connection with the comparison circuit 60 of FIG. 2 to detect the presence of a highly reflective circuit and inhibit the range detectors accordingly. Of course, both magnitude and rate type comparisons may be used in FIG. 3 and was the case in FIG. 1, using logic circuit like that of FIGURE 4.

It is seen that I have provided a system for determining when specular surfaces are encountered in connection with proximity detection and to inhibit the signals coming from the proximity detector when such surfaces are encountered. It will be obvious that many changes can be made to the specific disclosures used in connection with the preferred embodiments, for example, the resistor capacitor combination of the high pass filter 50 may be replaced by any other high pass device and the level detecting circuit of detector 60 including amplifier 6 and potentiometer wiper 64 may be replaced by other level detectors. Also, the scanning mechanism including motor 20, shaft 18, and mirror 16 may be replaced by other scanning devices and the pulsed level detector 10 which was described as consisting of apparatus from my U.S. Pat. No. 4,716,430 could likewise have apparatus similar to that shown in the above-mentioned U.S. Pat. No. 3,937,574, or any other appropriate modulated proximity detection system. Also, the logic diagram of FIG. 4 is exemplary only and those skilled in the art may readily devise alternate schemes to accomplish the desired result. I therefore do not wish to be limited by the specific disclosures used in connection with describing the preferred embodiments but wish only to be limited by the appended claims.

The embodiments of the invention in which an exclusive property or right is claimed are defined as follows:

1. In a proximity detecting system having a beam of energy transmitted to remote objects for reflection therefrom and energy detecting means positioned to receive reflected energy so as to produce an output of magnitude dependent on the amount of energy received thereby, apparatus for determining when reflected energy is received from a highly specular object, comprising:

first means connected to receive the output and to produce a resultant signal as a function thereof, the resultant signal having a value greater than a predetermined value when a specular surface is encountered; and second means connected to receive the resultant signal and to produce an inhibit signal when the resultant signal exceeds the predetermined value.

2. Apparatus according to claim 1 wherein the second means is a high pass filter.

3. Apparatus according to claim 1 wherein the second means is a level detector.

4. Apparatus according to claim 1 wherein energy detecting means includes first and second detectors and the first means includes a differential amplifier connected to the first and second detectors and operable to produce the resultant output in accordance with the difference therebetween.

5. Apparatus according to claim 1 wherein the first and second means are portions of a microcomputer.

6. Apparatus according to claim 3 wherein the level detector has a first input to receive the resultant signal and a second input to receive a reference signal, the level detector operating to produce the inhibit signal whenever the resultant signal exceeds the reference signal.

7. Apparatus according to claim 4 wherein the second means is a high pass filter.

8. Apparatus according to claim 4 wherein the second means is a level detector.

9. Apparatus according to claim 8 wherein the level detector has a first input to receive the resultant signal and a second input to receive a reference signal, the level detector operating to produce the inhibit signal whenever the resultant signal exceeds the reference signal.

10. Apparatus according to claim 5 wherein the first means includes a first subtract circuit to receive the outputs $D_1$ and $D_2$ of the detecting means and produce a $D_1-D_2$ output, storage means to store $D_1-D_2$ periodically and a second subtract circuit to subtract a present $D_1-D_2$ value and a previous $D_1'-D_2'$ value and produce the resultant signal S in accordance therewith.

11. Apparatus according to claim 5 wherein the first means includes a subtract circuit to receive the outputs $D_1$ and $D_2$ of the detecting means and produces an output V indicative of $D_1-D_2$.

12. Apparatus according to claim 10 further including a first level check circuit to compare S with a first reference value $+L1$ and to produce the inhibit signal if S is greater than $+L1$ and a second level check circuit to compare S with a second reference value $-L1$ and to produce the inhibit signal if S is less than $-L1$.

13. Apparatus according to claim 11 further including a first level check circuit to compare V with a first reference value $+R1$ and to produce the inhibit signal if V is greater than $+R1$ and a second level check circuit to compare V with a second reference value $-R1$ and to produce the inhibit signal if V is less than $-R1$.

14. A proximity detecting system comprising:
means for projecting a beam of energy;
scanning means for directing the beam of energy to remote objects for reflection therefrom;
detecting means to receive energy reflected from the objects and to produce first and second detector signals of magnitude dependent upon the amount of radiation received thereby, the relative magnitudes of the first and second detector signals varying as a function of the proximity of the objects;
function means connected to receive the first and second detection signals and to produce an output signal in accordance therewith; and
inhibit means connected to receive the output signal and operable to produce an inhibit signal whenever the output signal exceeds a predetermined value.

15. Apparatus according to claim 14 wherein the scanning means comprises a rotating mirror.

16. Apparatus according to claim 14 wherein the function means comprises a differential amplifier.

17. Apparatus according to claim 14 wherein the inhibit means comprises a high pass filter to pass output signals whose rate of change exceeds the filter pass level.

18. Apparatus according to claim 14 wherein the inhibit means comprises a level detector having a reference input and operable to produce an inhibit signal whenever the output signal exceeds the reference signal.

19. Apparatus according to claim 14 wherein the function means and the inhibit means comprise portions of a microprocessor.

* * * * *